US012804014B2

(12) United States Patent
Berger et al.

(10) Patent No.: US 12,804,014 B2
(45) **Date of Patent: *Nov. 17, 2026**

(54) LOOKALIKE DOMAIN IDENTIFICATION

(71) Applicant: Proofpoint, Inc., Sunnyvale, CA (US)

(72) Inventors: Abigail Lauren Berger, Lakewood, CO (US); Jos Dijkstra, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 19/010,327

(22) Filed: Jan. 6, 2025

(65) Prior Publication Data

US 2025/0141922 A1 May 1, 2025

Related U.S. Application Data

(63) Continuation of application No. 17/805,796, filed on Jun. 7, 2022, now Pat. No. 12,218,973.

(60) Provisional application No. 63/208,434, filed on Jun. 8, 2021.

(51) Int. Cl.
*H04L 9/40* (2022.01)
*G06F 9/451* (2018.01)

(52) U.S. Cl.
CPC .......... *H04L 63/1491* (2013.01); *G06F 9/451* (2018.02)

(58) Field of Classification Search
CPC ............................. H04L 63/1491; G06F 9/451
See application file for complete search history.

(56) References Cited

U.S. PATENT DOCUMENTS 8,885,984 B1 11/2014 Lavi et al.
12,218,973 B2 * 2/2025 Berger .................... G06F 9/451
2012/0042381 A1 * 2/2012 Antonakakis ....... H04L 61/4511 726/22
2015/0156210 A1 6/2015 Hunt et al.
2018/0063174 A1 3/2018 Grill et al.
2019/0019058 A1 * 1/2019 Woodbridge .......... G06V 10/82
2019/0387024 A1 * 12/2019 Schulman ........... H04L 63/0236
2020/0099716 A1 * 3/2020 Sjouwerman ....... H04L 63/1466
(Continued)

OTHER PUBLICATIONS

Wolf Garbe "1000x-faster-spelling-correction-algorithm-2012", Jun. 6, 2012.
(Continued)

*Primary Examiner* — Thaddeus J Plecha
(74) *Attorney, Agent, or Firm* — Banner & Witcoff, Ltd.

(57) ABSTRACT

Aspects of the disclosure relate to identifying domain name lookalikes. A computing platform may generate a plurality of lookalike domain names for an input domain name. The computing platform may generate, by applying a hash algorithm to the plurality of lookalike domain names, a dictionary index. The computing platform may identify a first domain name. The computing platform may identify, by performing a lookup function in the dictionary index using the first domain name, that the first domain name is a lookalike domain name corresponding to the input domain name. The computing platform may send, to a user device, one or more commands directing the user device to display a user interface that includes the lookalike domain name, which may cause the user device to display the user interface.

20 Claims, 7 Drawing Sheets

(56) References Cited

U.S. PATENT DOCUMENTS

2020/0252428 A1* 8/2020 Gardezi .............. H04L 63/1416
2021/0264233 A1 8/2021 Gronát et al.

OTHER PUBLICATIONS

Jun. 20, 2024—(US) Office Action—U.S. Appl. No. 17/805,796.
Oct. 9, 2024—(US) Notice of Allowance—U.S. Appl. No. 17/805,796.

* cited by examiner

LOOKALIKE DOMAIN IDENTIFICATION

CROSS-REFERENCE TO RELATED APPLICATIONS

This application a Continuation application of U.S. application Ser. No. 17/805,796, filed on Jun. 7, 2022, and entitled "Lookalike Domain Identification," which claims the benefit of and priority to U.S. Provisional Patent Application Ser. No. 63/208,434, filed Jun. 8, 2021, and entitled "Supplier Lookalikes," both of which are incorporated by reference herein in its entirety.

TECHNICAL FIELD

Aspects of the disclosure relate to domain identification and management systems, data processing methods, machine learning systems, and communication systems and networks. In particular, one or more aspects of the disclosure relate to identifying lookalike domains using a dictionary index and/or detecting malicious domains using machine learning.

BACKGROUND

Increasingly, organizations face various cybersecurity threats through electronic communications. Various methods of message analysis have been developed to combat these threats. It remains difficult, however, for message recipients to distinguish between trusted email communication from legitimate domains and other (sometimes malicious) communication from lookalike domains, resembling the legitimate domains. This may be especially dangerous in enterprise environments, where lookalike domain names of trusted partners, suppliers, and/or other sources may be generated and used to perform malicious actions towards the enterprise. Accordingly, it may be important to improve detection of such lookalike domains in electronic communication. Attempts to integrate such analysis techniques into efficient and effective automated processes present additional technical challenges, however, particularly when trying to balance and optimize efficiency and time constraints against the consumption of the computing resources, such as processing power, which may be used in analysis of a large number of domain names.

SUMMARY

Aspects of the disclosure provide technical solutions that overcome one or more of the technical problems described above and/or other technical challenges. For instance, one or more aspects of the disclosure relate to identifying lookalike domains. In accordance with one or more embodiments, a computing platform having at least one processor, a communication interface, and memory may generate a plurality of lookalike domain names for an input domain name. The computing platform may generate, by applying a hash algorithm to the plurality of lookalike domain names, a dictionary index. The computing platform may identify a first domain name. The computing platform may identify, by performing a lookup function in the dictionary index using the first domain name, that the first domain name comprises a lookalike domain name corresponding to the input domain name. The computing platform may send, to a user device, one or more commands directing the user device to display a user interface that includes the lookalike domain name, which may cause the user device to display the user interface.

In one or more instances, generating the plurality of lookalike domain names may include generating, for the input domain name, lookalike domain names that are potential variations of the input domain name. In one or more instances, generating the plurality of lookalike domain names may include removing, from the input domain name, one or more characters before generating the plurality of lookalike domain names.

In one or more examples, the plurality of lookalike domain names may include lookalike domain names for a plurality of other input domain names. In one or more examples, identifying the first domain name may include detecting an electronic message sent from the first domain name.

In one or more instances, identifying that the first domain name is the lookalike domain name corresponding to the input domain name may include comparing metadata of the first domain name with the input domain name. In one or more instances, comparing the metadata of the first domain name with the input domain name may include identifying that one or more characters of the first domain name are different than the input domain name, the first domain name has a different top level domain (TLD) than the input domain name, and/or other comparisons.

In one or more examples, the computing platform may identify, after identifying that the first domain name is the lookalike domain name, whether the lookalike domain name corresponds to a threat. Based on identifying that the lookalike domain name corresponds to the threat, the computing platform may send one or more notifications indicating the threat, block messages corresponding to the lookalike domain name, quarantine messages corresponding to the lookalike domain name, rewrite URLs corresponding to the lookalike domain name, and/or perform other functions. Based on identifying that the lookalike domain name does not correspond to the threat, the computing platform may route messages corresponding to the lookalike domain name for delivery.

In one or more instances, identifying whether the lookalike domain name corresponds to the threat may include: generating, based on metadata corresponding to the first domain name, a maliciousness score indicating a threat level of the first domain name; comparing the maliciousness score to a maliciousness threshold; based on identifying that the maliciousness score meets or exceeds the maliciousness threshold, identifying that the first domain name corresponds to the threat; and based on identifying that the maliciousness score does not meet or exceed the maliciousness threshold, identifying that the first domain name does not correspond to the threat. In one or more instances, the notification may indicate that an identity of input domain name is under attack, and a first enterprise corresponding to the input domain name may be member of a supply chain for a second enterprise corresponding to the user device.

In one or more examples, the one or more notifications may include registration information for the first domain name, registration information for the input domain name, and/or other information. In one or more examples, the one or more notifications may include a service configured for domain names to be input, and corresponding lookalike domains to be output in real time.

In one or more instances, the computing platform may identify an entity corresponding to the lookalike domain name. The computing platform may store a count of electronic messages sent from the lookalike domain name to the entity.

In one or more examples, the first domain name may be identified based on a scan of historical messaging traffic. In one or more examples, the first domain name may be identified prior to receiving an electronic message from the input domain name.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

One or more arrangements described herein address problems associated with identification of domain name lookalikes. Aspects described are generally related to identifying and classifying incoming emails to an organization as originating from a trusted partner, supplier, or other organization the receiving organization has a business or other financial relationship with. Additionally or alternatively, incoming emails may be identified and classified for other legitimate entities with which the receiving organization does not yet have a relationship with, but are nevertheless legitimate.

In some examples, arrangements may be used to identify domain name lookalikes specifically with regard to members of a supply chain. A domain name lookalike may be a set of one or more domain names, which could be easily confused with each other. Lookalike domains may be frequently used by unauthorized users to trick end users into trusting email communication as though it was coming from a trusted source. For example, if a legitimate domain is domain.com, and example lookalike may be domain.com, or other variation of the legitimate domain that may be easily confused with the legitimate domain. Specifically, the methods described herein address the scale at which lookalike domains are to be identified. For example, a set of domain name data may include millions of known domain names that have been registered, and a smaller set of interesting or other supplier domains for which lookalikes should be detected. Using traditional methods, comparing each input domain to the set of known domain names may result in quadrillions of comparisons, which may be difficult to process in any reasonable time or within cost limits. Accordingly, the systems and methods described herein may detect lookalikes faster and more efficiently in order to reduce or eliminate impact of the lookalikes.

These and other methods are described further in more detail in the following description.

Figure 1:
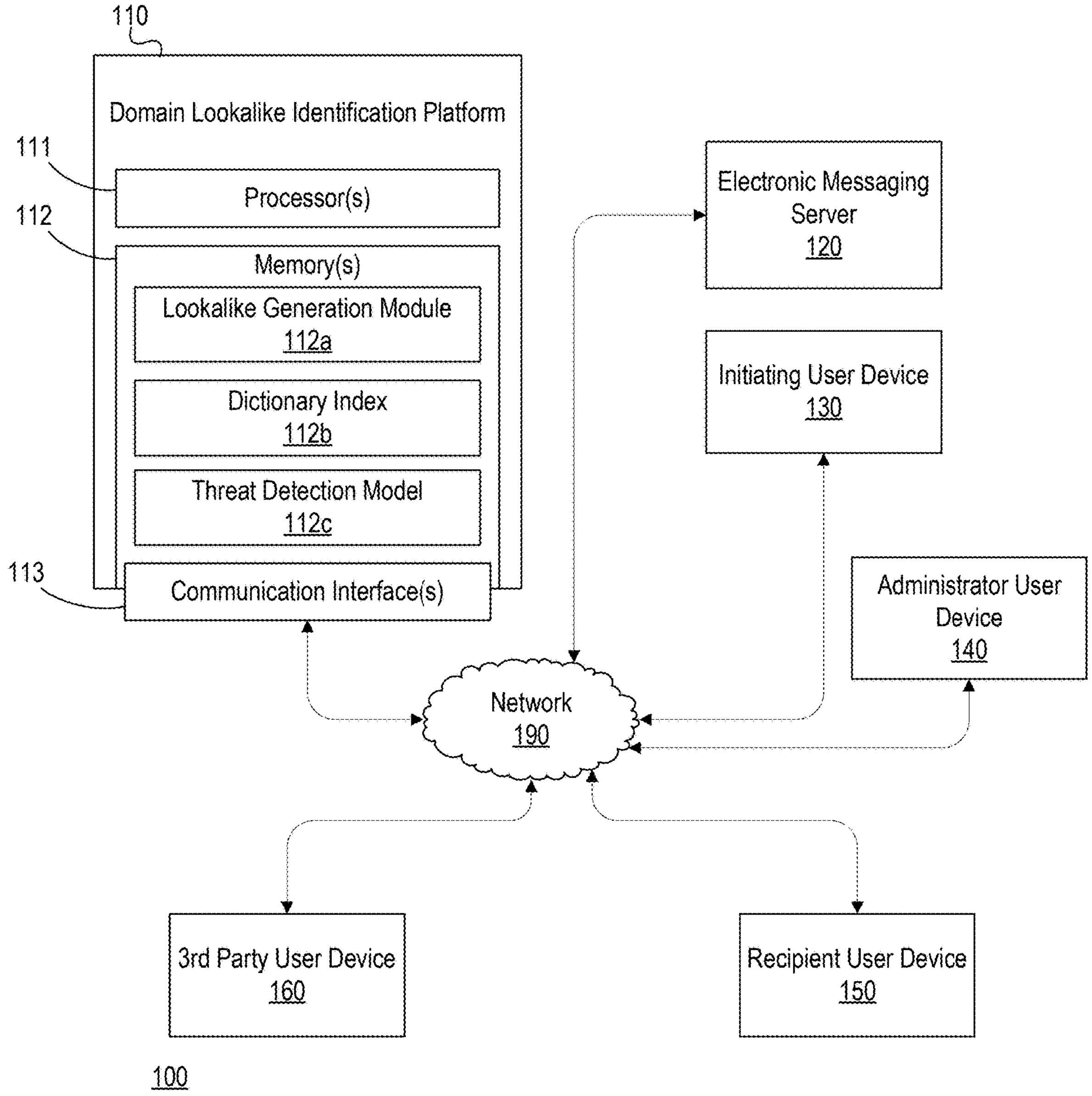
FIG. 1 depicts an illustrative operating environment for domain name lookalike identification in accordance with one or more example embodiments.

FIG. 1 depicts an illustrative operating environment for domain name lookalike identification in accordance with one or more example embodiments. Referring to FIG. 1, computing environment 100 may include various computer systems, computing devices, networks, and/or other operating infrastructure. For example, computing environment 100 may include a domain lookalike identification platform 110, electronic messaging server 120, initiating user device 130, administrator user device 140, recipient user device 150, third party user device 160, and a network 190.

Network 190 may include one or more wired networks and/or one or more wireless networks that interconnect domain lookalike identification platform 110, electronic messaging server 120, initiating user device 130, administrator user device 140, recipient user device 150, third party user device 160, and/or other computer systems and/or devices. In addition, each of domain lookalike identification platform 110, electronic messaging server 120, initiating user device 130, administrator user device 140, recipient user device 150, and/or third party user device 160 may be special purpose computing devices configured to perform specific functions, as illustrated in greater detail below, and may include specific computing components such as processors, memories, communication interfaces, and/or the like.

Domain lookalike identification platform 110 may include one or more processor(s) 111, one or more memory(s) 112, and one or more communication interface(s) 113. In some instances, domain lookalike identification platform 110 may be made up of a plurality of different computing devices, which may be distributed within a single data center or a plurality of different data centers. In these instances, the one or more processor(s) 111, one or more memory(s) 112, and one or more communication interface(s) 113 included in domain lookalike identification platform 110 may be part of and/or otherwise associated with the different computing devices that form domain lookalike identification platform 110.

In one or more arrangements, processor(s) 111 may control operations of domain lookalike identification platform 110. Memory(s) 112 may store instructions that, when executed by processor(s) 111, cause domain lookalike identification platform 110 to perform one or more functions, as discussed below. Communication interface(s) 113 may include one or more wired and/or wireless network interfaces, and communication interface(s) 113 may connect domain lookalike identification platform 110 to one or more networks (e.g., network 190) and/or enable domain lookalike identification platform 110 to exchange information and/or otherwise communicate with one or more devices connected to such networks.

In one or more arrangements, memory(s) 112 may store and/or otherwise provide a plurality of modules (which may, e.g., include instructions that may be executed by processor (s) 111 to cause domain lookalike identification platform 110 to perform various functions) and/or databases (which may, e.g., store data used by domain lookalike identification platform 110 in performing various functions). For example, memory(s) 112 may store and/or otherwise provide lookalike generation module 112*a*, dictionary index 112*b*, and a threat detection model 112*c*. In some instances, lookalike generation module 112*a* may store instructions that cause domain lookalike identification platform 110 to identify variations of known domain names. Additionally, dictionary index 112*b* may store the identified variations of the known domain names, along with correlations with the corresponding known domain names and/or other information. Furthermore, threat detection model 112*c* may be a machine learning engine, model, algorithm, or the like, which may store instructions and/or data that may cause and/or be used by domain lookalike identification platform 110 to identify whether or not a lookalike domain name corresponds to a threat, and/or execute one or more other functions described herein.

Electronic messaging server 120 may be or include one or more devices configured to route and/or otherwise facilitate the transmission of messages between message senders and message recipients, and/or perform other functions. In some instances, the electronic messaging server 120 may be associated with an enterprise organization of the domain lookalike identification platform 110. In some instances, actions described herein as being performed by the electronic messaging server 120 may, in some instances, be performed by a network gateway server without departing from the scope of the disclosure.

Initiating user device 130 may be configured to be used by an individual who may, e.g., be either a legitimate individual (e.g., a supplier) or a bad actor (e.g., impersonating a supplier). For example, the individual may use the initiating user device 130 to compose and/or otherwise send an electronic message. In some instances, the initiating user device 130 may be one of a mobile device, smartphone, tablet, laptop computer, desktop computer, and/or other device configured for electronic messaging. In some instances, initiating user device 130 may be configured to present one or more user interfaces (e.g., which may, e.g., enable the individual to create electronic messages, and/or otherwise provide user input).

Administrator user device 140 may be configured to be used by an individual who may, e.g., be an employee or otherwise associated with an enterprise organization of the domain lookalike identification platform 110. For example, the individual may use the administrator user device 140 to define rules, policies, and/or other information that may be used to generate the lookalike domain names and/or train the threat detection model. In some instances, the administrator user device 140 may be one of a mobile device, smartphone, tablet, laptop computer, desktop computer, and/or other device configured for electronic messaging. In some instances, administrator user device 140 may be configured to present one or more user interfaces (e.g., malicious domain identification interfaces, domain name input interfaces, and/or other interfaces).

Recipient user device 150 may be configured to be used by an individual who may, e.g., be an employee or otherwise associated with an enterprise organization affiliated with the domain lookalike identification platform 110. For example, the individual may use the recipient user device 150 to receive or otherwise access an electronic message. In some instances, the recipient user device 150 may be one of a mobile device, smartphone, tablet, laptop computer, desktop computer, and/or other device configured for electronic messaging. In some instances, recipient user device 150 may be configured to present one or more user interfaces (e.g., which may, e.g., electronic messaging interfaces and/or other interfaces).

Third party user device 160 may be configured to be used by an individual who may, e.g., be an employee or otherwise associated with a supplier for the enterprise organization of the domain lookalike identification platform 110. For example, the individual may use the third party user device 160 to receive or otherwise access an electronic message, and/or otherwise communicate with the enterprise organization. In some instances, the third party user device 160 may be one of a mobile device, smartphone, tablet, laptop computer, desktop computer, and/or other device configured for electronic messaging. In some instances, third party user device 160 may be configured to present one or more user interfaces (e.g., which may, e.g., electronic messaging interfaces, malicious domain notifications, and/or other interfaces).

Figure 2A:
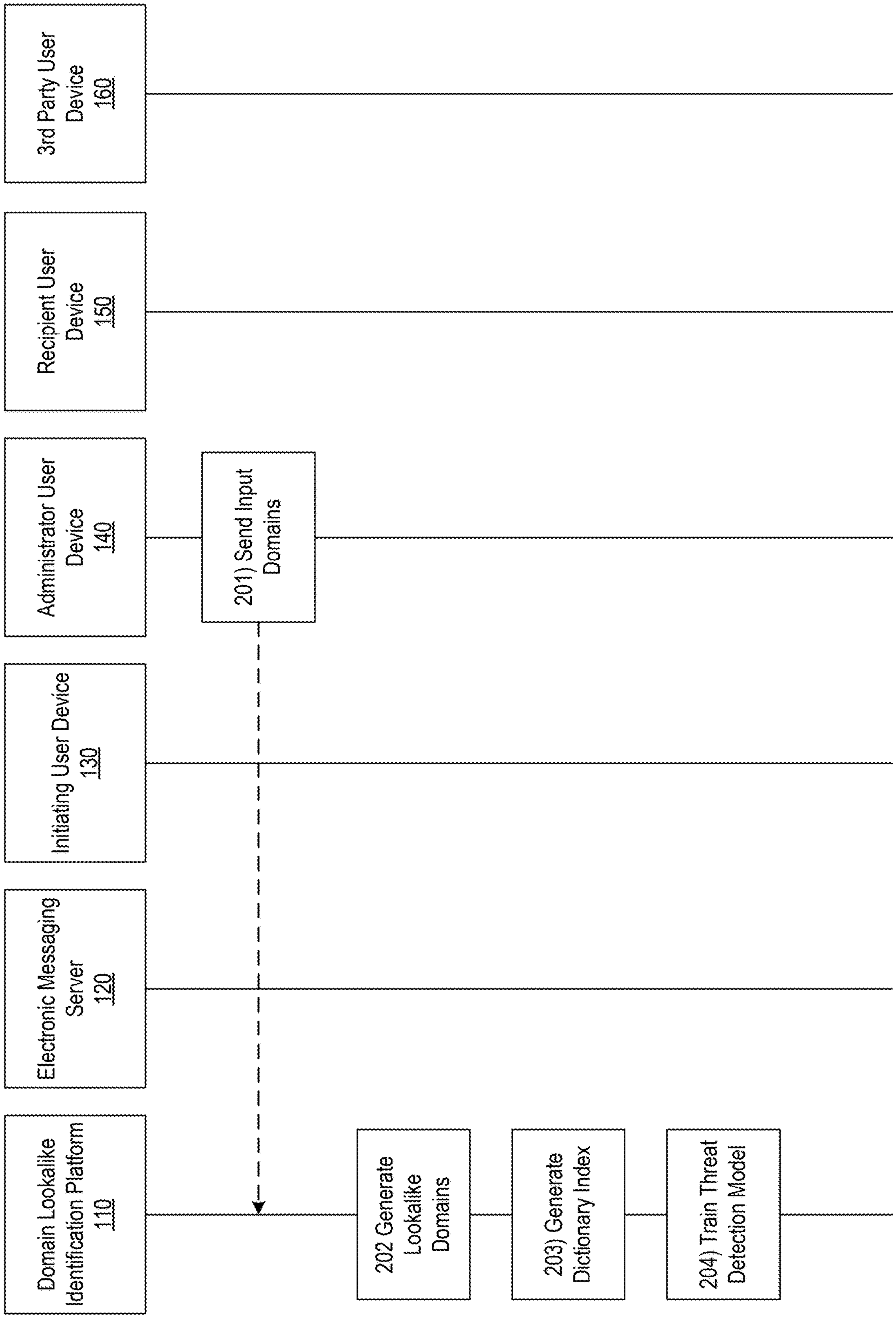
FIGS. 2A-2D depict an illustrative event sequence for domain name lookalike identification in accordance with one or more example embodiments.

FIGS. 2A-2D depict an illustrative event sequence for domain name lookalike identification in accordance with one or more example embodiments. Referring to FIG. 2A, at step 201, the administrator user device 140 may send one or more input domains to the domain lookalike identification platform 110. For example, the administrator user device 140 may receive one or more domains, input via a user interface of the administrator user device 140. In some instances, the administrator user device 140 may send legitimate (e.g., not a lookalike or otherwise malicious) domain names, such as domain names corresponding to members of a supply chain for an enterprise organization corresponding to the domain lookalike identification platform 110. In some instances, in addition or as an alternative to manually inputting domains, input domains may be automatically identified (e.g., based on historical correspondence, vendor lists, industry leaders, web traffic, and/or other information) by the administrator user device 140 and/or the domain lookalike identification platform 110 itself.

At step 202, the domain lookalike identification platform 110 may generate a plurality of lookalike domain names for each input domain name. In doing so, the domain lookalike identification platform 110 may implement one or more previously defined rules, policies, and/or other information. For example, the domain lookalike identification platform 110 may perform character(s) insertion/omission/substitution, top level domain (TLD) variation, bridging the dot, hyphenation, appending a prefix/suffix, adding a supplier or other trusted entity name as a TLD/subdomain, and/or generation other variations/combinations of the input domain names. In some instances, the domain lookalike identification platform 110 may remove, for each input domain name, one or more characters before generating the lookalike domain names (e.g., a symmetrical delete method, wildcard method, and/or other method).

For example, the domain lookalike identification platform 110 may identify variations of a particular supplier domain (e.g., all expected variations, all variations according to known rules, and/or otherwise). As a result, the domain lookalike identification platform 110 may generate a plurality of known domain name variations corresponding to all known legitimate domain names (e.g., the input domain names described at step 201).

At step 203, once the plurality of lookalike domain names is identified at step 202, they may be stored in a dictionary index. For example, the domain lookalike identification platform 110 may hash the lookalike domain names, and construct a dictionary index that may be used to identify relationships between the input domain names (e.g., supplier domain names and/or other trusted domain names, and the lookalike domain names). In some instances, in constructing the dictionary index, the domain lookalike identification platform 110 may assign a number to each lookalike domain name, and allocate a data structure that includes these numbers, and the corresponding input domain names. In doing so, the domain lookalike identification platform 110 may quickly and efficiently reference an input domain name for a given lookalike domain name by performing a lookup on the hash value and identifying the input domain in the corresponding row.

Unlike other identification methods, such as pure Levenshtein distance calculations or homoglyph identification, which may be associated with significant processing times, a dictionary/hash data structure as described herein may greatly decrease processing times for lookalike identification. Additionally, unlike other identification methods such as using the Levenshtein algorithm to compare sets of domain names, using pre-calculated domain name variations and a constant-time hashing algorithm, as described above, may allow a lookalike detection algorithm that scales linearly with the set of domains to be compared.

For example, in some conventional arrangements, two bits of text may be compared at a time. As an example, to compare 1000 registered domains to 100 supplier/input/trusted domains, each pairing of those domains needs to be compared, which results in 100,000 comparisons. Each time the number of inputs is doubled, the number of comparisons may double, and thus the time it may take to compute the comparisons may increase exponentially by a factor of four. Accordingly, for any large set of input domains, conventional arrangements may become prohibitively expensive in terms of calculation time.

Thus, by pre-calculating probable variations in the domain names in advance, and using this shared set of data as a database of values to search for any matching input domains, the dictionary index described herein may provide significant advantages. While the set of domains to search against might still grow from 1000 registered domains to 100,000 possible variations, the work of comparing the 100 input domains for which to find lookalikes may be a constant time operation. The dictionary data structure may then be used by taking an input domain and comparing it against all of the 100,000 variations using a dictionary lookup (as described below at step 207). In some instances, this may, in effect, be a single comparison for each input domain, rather than 1000 (e.g., rather than the pair-wise comparisons described above). Unlike conventional arrangements, if the amount of input domains doubles, the processing time may increase linearly. Thus, not only is each comparison vastly more efficient than conventional arrangements, but if the input doubles, the work doubles as well (rather than increasing by a factor of 4 as described above with regard to conventional arrangements).

In some instances, steps 201-203 may be repeated (e.g., at predetermined intervals or otherwise) to continually update the dictionary index with additional lookalike and/or input domain names.

At step 204, the domain lookalike identification platform 110 may train a threat detection model. For example, the domain lookalike identification platform 110 may train a threat detection model to identify, by inputting a lookalike domain name into the threat detection model, a maliciousness score (e.g., a numeric value representing a likelihood that the corresponding lookalike domain name is malicious). In some instances, in doing so, the domain lookalike identification platform 110 may use domain names, previously identified and labelled as either malicious or non-malicious, as inputs to train the model.

In some instances, the domain lookalike identification platform 110 may train the threat detection model to apply one or more filters to domain names to identify whether or not they are malicious. For example, the domain lookalike identification platform 110 may train the threat detection model to use metadata corresponding to a lookalike domain to compare the lookalike domain to a corresponding input domain.

For example, the threat detection model may be trained to identify a number of letters changed between the domains. The threat detection model may be trained to compare this identified number of changed letters to a threshold number of letters, and may identify that the lookalike domain is malicious if the identified number of changed letters exceeds the threshold number. In some instances, the threat detection model may be trained to automatically filter out lookalike domains with an edit distance greater than one, by flagging them as malicious without further analysis.

Additionally or alternatively, the threat detection model may be trained to identify whether the extension of the lookalike domain name matches the extension of the corresponding input domain name. In instances where the extensions do not match, the threat detection model may be trained to identify that the lookalike domain name is malicious (or there is a higher likelihood that it is malicious). Otherwise, the threat detection model may be trained to identify that the lookalike domain name is not malicious (or there is a lower likelihood that it is malicious).

Additionally or alternatively, the threat detection model may be trained to identify whether homoglyphs were used or not. In instances where homoglyphs were used, the threat detection model may be trained to identify that the lookalike domain name is malicious (or there is a higher likelihood that it is malicious). Otherwise, if no homoglyphs were used, the threat detection model may be trained to identify that the lookalike domain name is not malicious (or there is a lower likelihood that it is malicious).

Additionally or alternatively, the threat detection model may be trained to identify whether the input domain name is included within the lookalike domain name and/or whether the lookalike domain name includes the input domain name. In these instances, the threat detection model may be trained to identify that the lookalike domain name is malicious (or there is a higher likelihood that it is malicious).

Additionally or alternatively, the threat detection model may be trained to identify whether or not the lookalike domain name is malicious based on an age of the domain. For example, the threat detection model may be trained to output a larger likelihood of maliciousness score for newer domains (e.g., domains created less than a threshold or pre-determined time (e.g., less than six weeks, less than one year, or the like)) than for older domains (e.g., prior to the time period).

Additionally or alternatively, the threat detection model may be trained to compare the lookalike domain name to a threat list. In instances where the lookalike domain name is on the threat list, the threat detection model may be trained to output a larger likelihood of maliciousness score (when compared to domain names that are not on the threat list).

Additionally or alternatively, the threat detection model may be trained to compare a registration email address for the lookalike domain name to the registration email for the corresponding input domain name. The threat detection model may be trained to output a larger likelihood of maliciousness score when the registration emails do not match (in comparison to when they do match).

Additionally or alternatively, the threat detection model may be trained to identify a frequency of use for the lookalike domain name and compare the frequency of use to a frequency of use threshold. In these instances, the threat detection model may be trained to output a higher likelihood of maliciousness score when the frequency of use meets exceeds the frequency of use threshold (e.g., as opposed to when the frequency of use does not meet or exceed the frequency of use threshold).

Additionally or alternatively, the threat detection model may be trained to identify whether threats are being actively sent from the lookalike domain. If threats are actively being sent (i.e., within a predetermined period of time), the threat detection model may be trained to output a higher likelihood of maliciousness score (e.g., when compared to if threats are not actively being sent).

Additionally or alternatively, the threat detection model may be trained to compare a reputation score and/or other reputation information for the lookalike domain name to a reputation threshold and/or otherwise. If the reputation scores fails to meet or exceed a reputation threshold, the threat detection model may be trained to output a higher likelihood of maliciousness score (e.g., when compared to a reputation score that does meet or exceed the reputation threshold).

Additionally or alternatively, the threat detection model may be trained to analyze whois data for the lookalike domain to identify whether it corresponds to whois data for the corresponding input domain. If the whois data does not match, the threat detection model may be configured to output a higher likelihood of maliciousness score (e.g., when compared to whois data that does match).

Additionally or alternatively, the threat detection model may be trained to compare a registrar country for the lookalike domain to a list of suspect registrar countries and/or a registrar country for the corresponding input domain. In these instances, if the registrar country is on the list of suspect registrar countries and/or does not match the registrar country for the corresponding input domain, the threat detection model may be trained to output a higher likelihood of maliciousness score (e.g., when compared to registrar countries not on the list of suspect registrar countries and/or that match the registrar country).

Additionally or alternatively, the threat detection model may be trained to identify whether the header of the lookalike domain contains mismatching data. If the header does include mismatching data, the threat detection model may be trained to identify a higher likelihood of maliciousness score (e.g., when compared to headers without mismatching data).

Additionally or alternatively, the threat detection model may be trained to identify whether or not a webpage exists for the corresponding input domain. If a webpage does not exist for the corresponding input domain, the threat detection model may be trained to identify a higher likelihood of maliciousness score (e.g., when compared to instances where a webpage does exist for the corresponding input domain).

Additionally or alternatively, the threat detection model may be trained to look at traffic for the lookalike domain name and/or the corresponding seed domain to identify whether the lookalike domain is targeting partners of an enterprise of the seed domain. If such targeting is identified for the corresponding input domain, the threat detection model may be trained to identify a higher likelihood of maliciousness score (e.g., when compared to instances where such targeting is not detected).

Additionally or alternatively, the threat detection model may be trained to analyze message content to identify whether it contains branding, text, links, and/or other information corresponding to other input domains. If so, the threat detection model may be trained to identify a higher likelihood of maliciousness score (e.g., when compared to instances where such information is not identified).

In some instances, the threat detection model may be trained to analyze these factors individually and/or in a weighted and/or otherwise combined manner. For example, the threat detection model may be trained to make an overall determination based on weighting several factors that indicate maliciousness and/or other factors that indicate non-maliciousness. For example, the threat detection model may be trained to output a value of 1 (e.g., indicating maliciousness) or 0 (e.g., indicating non-maliciousness) for each of a subset of the above described factors. In these instances, the threat detection model may be trained to determine a sum of these values, and divide it by the total number of factors considered to produce the final maliciousness score (which may, e.g., be compare to a maliciousness threshold to indicate whether or not the lookalike domain is deemed to be malicious). For example, the threat detection model may be trained to output "malicious domain" if the maliciousness score is greater than or equal to 0.5 (or other threshold value), and "non-malicious domain" if the maliciousness score is less than 0.5 (or other threshold value). In some instances, the threat detection model may be trained to weight all factors evenly, or in some instances, one or more factors may be weighted differently. In some instances, the threat detection model may dynamically refine and/or otherwise tune the maliciousness threshold based on user feedback and/or other information.

Figure 2B:
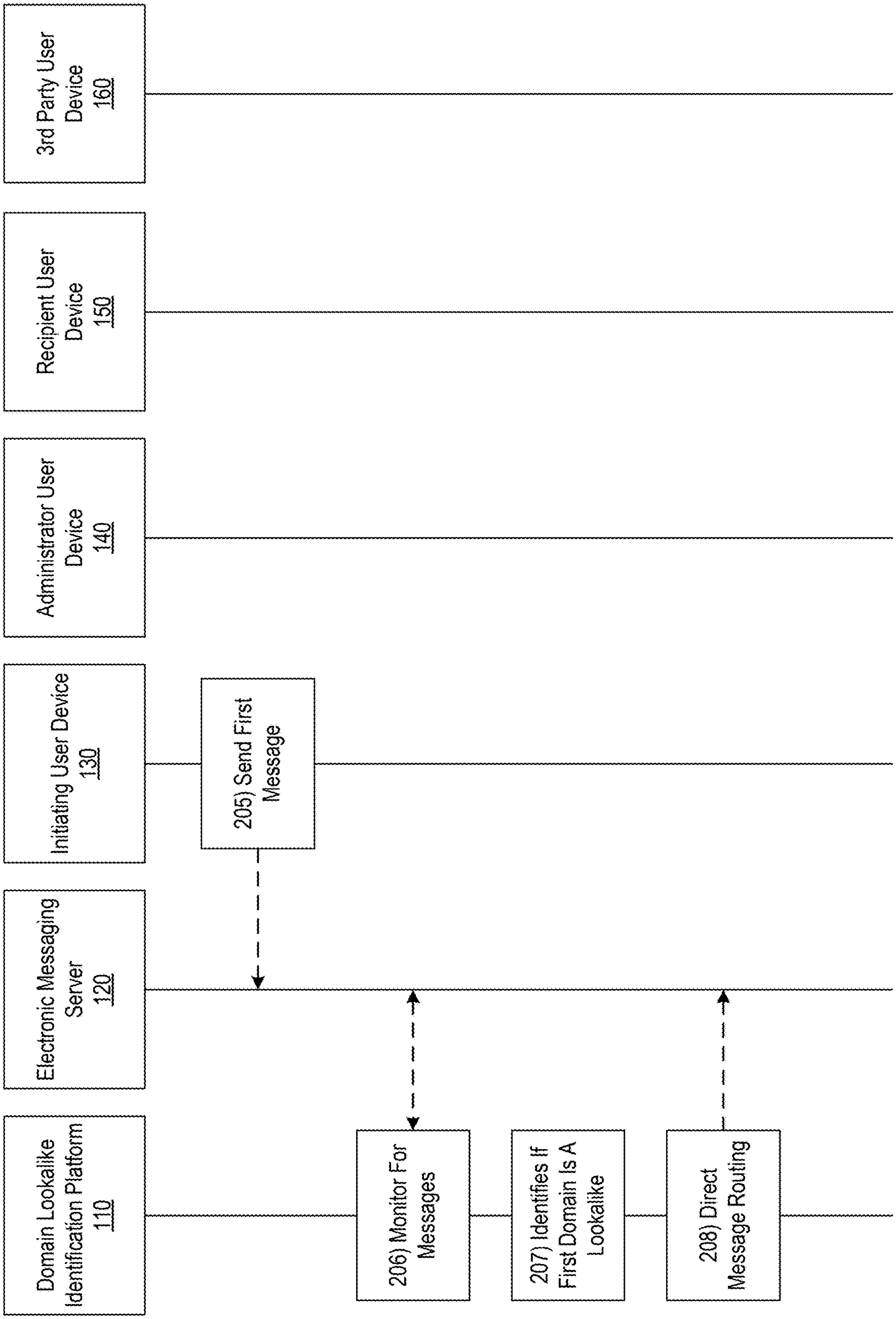

Referring to FIG. 2B, at step 205, the initiating user device 130 may send a first message to the electronic messaging server 120. For example, the initiating user device 130 may send a first message, directed to a recipient user (e.g., of the recipient user device 150), which may, e.g., be routed through the electronic messaging server 120. In some instances, the initiating user device 130 may be associated with a lookalike domain name and/or malicious domain (e.g., a domain similar or substantially similar to an expected or legitimate domain of a legitimate entity). In other instances, the initiating user device 130 may correspond to a legitimate domain (e.g., an expected domain or entity).

At step 206, the domain lookalike identification platform 110 may monitor the electronic messaging server 120 for messages. In some instances, the domain lookalike identification platform 110 may detect the first message within a predetermined interval of its receipt (e.g., a minute, or other time period). Additionally or alternatively, the domain lookalike identification platform 110 may detect historical messages and/or other network traffic. In either instance, the domain lookalike identification platform 110 may detect a first domain from which or to which the first message and/or other network traffic may have been directed.

At step 207, the domain lookalike identification platform 110 may identify whether or not the first domain name is a lookalike domain. For example, the domain lookalike identification platform 110 may perform a lookup function, using the first domain name and the dictionary index, to identify whether the first domain name matches one of the plurality of lookalike domains or one of the input domains. In some instances, the domain lookalike identification platform 110 may also quickly and efficiently reference the corresponding input domain. For example, the domain lookalike identification platform 110 may perform a lookup on a hash value corresponding to an identified lookalike domain and identify the input domain in the corresponding row. For example, the domain lookalike identification platform 110 may hash the first domain name, and compare the resulting value to the pre-populated hash values (representative of the lookalike domains) stored in the dictionary index. If a match is detected, the corresponding input domain may be identified based on the pre-stored correlations between the lookalike domain hash values and their corresponding input domains.

As described above at step 203, unlike other identification methods, such as pure Levenshtein distance calculations or homoglyph identification, which may be associated with significant processing times, using the dictionary/hash data structure may greatly decrease processing times for lookalike identification. Additionally, unlike other identification methods such as using the Levenshtein algorithm to compare sets of domain names, using pre-calculated domain name variations and a constant-time hashing algorithm may allow a lookalike detection algorithm that scales linearly with the set of domains to be compared.

In some instances, the domain lookalike identification platform 110 may perform further filtering if a lookalike match is identified. For example, if the domain lookalike identification platform 110 identifies a lookalike domain, but identifies a corresponding edit distance greater than one or more characters and/or a different extension than the corresponding input domain, the domain lookalike identification platform 110 might not consider the first domain name to be a lookalike domain. In doing so, the domain lookalike identification platform 110 may reduce an amount of false positives identified. In some instances, the domain lookalike identification platform 110 may perform such filtering in the initial generation of the lookalike domain names for the dictionary index at step 202. In doing so, the domain lookalike identification platform 110 may reduce the set of output lookalike domain names, which may reduce processing resources needed for comparison.

If the domain lookalike identification platform 110 identifies that the first domain name matches one of the plurality of lookalike domains, the domain lookalike identification platform 110 may identify that the first domain name is a lookalike domain name, and may proceed to step 210. Otherwise, if the domain lookalike identification platform 110 identifies that the first domain name matches an input domain, the domain lookalike identification platform 110 may identify that the first domain name is a legitimate domain name, and may proceed to step 208.

At step 208, based on identifying that the first domain name is a legitimate domain name, the domain lookalike identification platform 110 may direct the electronic messaging server 120 to route the first message (and/or other messages/traffic corresponding to the first domain name) to the intended recipient (e.g., the recipient user device 150).

Figure 2C:
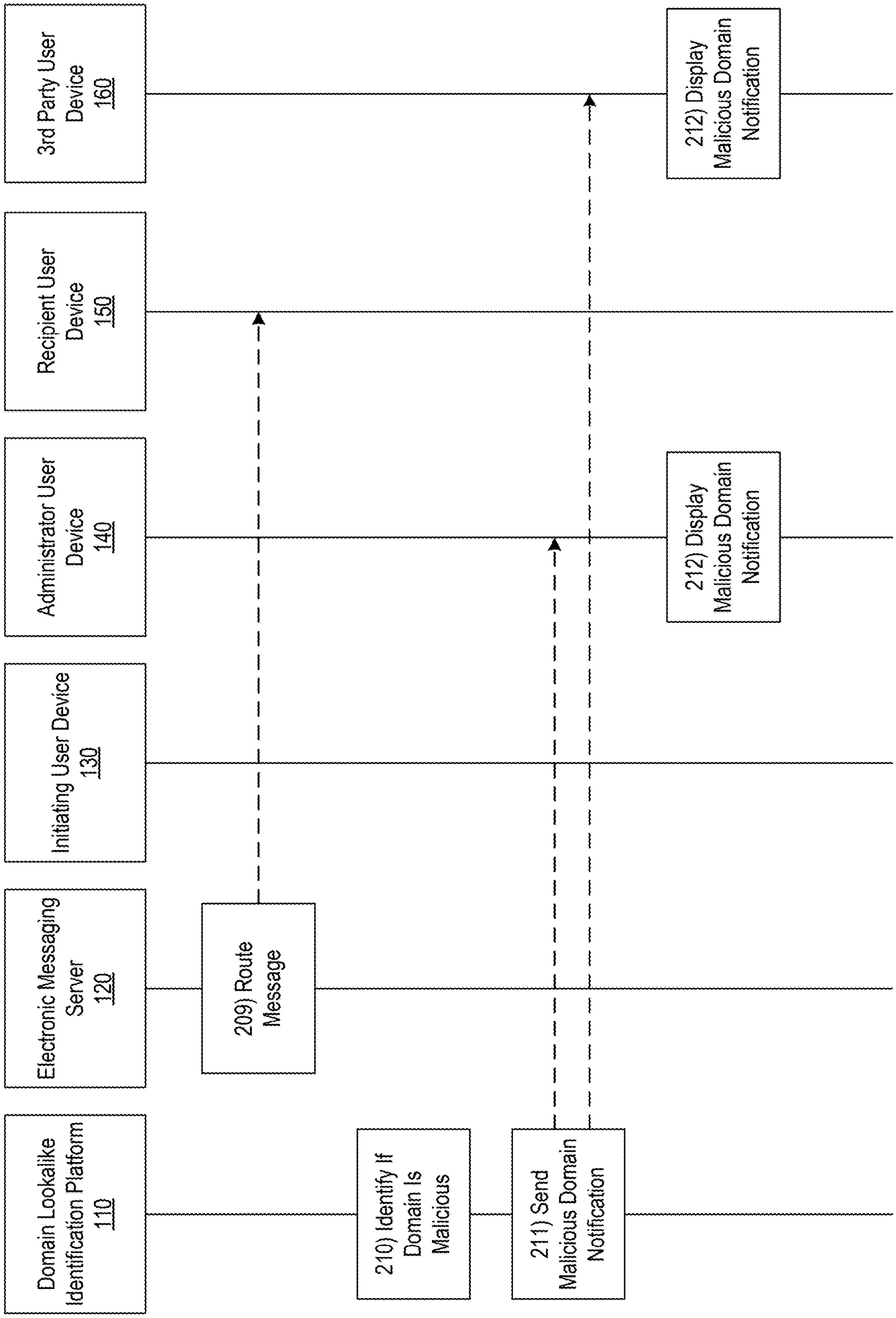

Referring to FIG. 2C, at step 209, based on or in response to the one or more commands directing the electronic messaging server 120 to route the first message (and/or other messages), the electronic messaging server 120 may route the first message to the recipient user device 150 (and/or other messages to their intended recipients/traffic to its intended destination).

Returning to step 207, if the domain lookalike identification platform 110 identified that the first domain name is a lookalike domain name, at step 210, the domain lookalike identification platform 110 may identify whether or not the lookalike domain name corresponds to a malicious domain. For example, the domain lookalike identification platform 110 may input the first domain name into the threat detection model, the training of which is described above with regard to step 204.

For example, as described above, the domain lookalike identification platform 110 may use the threat detection model to output a maliciousness score for the first domain name (and/or the corresponding first domain) based on one or more factors (e.g., how many letters were changed, whether the extension is the same or different, whether homoglyphs were used or not, whether the input domain is contained within the lookalike domain and/or contains the lookalike domain name, an edit distance, differing extensions, an age of the first domain, whether or not the first domain is on a threat list, comparison of a registration email address for the lookalike and the corresponding input domain, a frequency of use for the lookalike domain, whether threats are being actively sent from the lookalike domain, reputation data, whois data, whether the registrar country is on a list of suspect registrar countries and/or matches a registrar country for the corresponding input domain name, whether a corresponding webpage exists, and/or other factors).

Based on this analysis, the threat detection model may output a maliciousness score, which may, e.g., be a weighted result of one or more of the above described factors. This maliciousness score may then be compared, by the threat detection model, to a threat detection threshold. If the maliciousness score meets or exceeds the threat detection threshold, the threat detection model may identify that the lookalike domain corresponds to a threat. In these instances, the domain lookalike identification platform 110 may proceed to step 211. In some instances, if the lookalike domain corresponds to a threat, the domain lookalike identification platform 110 may store an entity or enterprise of the corresponding input domain and/or a count of mail sent to the enterprise from the lookalike domain. Otherwise, if the maliciousness score does not meet or exceed the threat detection threshold, the threat detection model may identify that the lookalike domain does not correspond to a threat. In these instances, the domain lookalike identification platform 110 may return to step 208.

In either instance, once the threat detection model has identified whether or not the first domain name corresponds to a malicious domain, the threat detection model may dynamically update based on the model output, user feedback, and/or other information. In doing so, the threat detection model may establish a dynamic feedback loop to continuously refine and/or increase accuracy of the threat detection model based on its own outputs and/or other information.

At step 211, the domain lookalike identification platform 110 may send a malicious domain notification to the administrator user device 140 and/or the third party user device 160. In some instances, the domain lookalike identification platform 110 may also send one or more commands directing the administrator user device 140 and/or the third party user device 160 to display the malicious domain notification.

Figure 4:
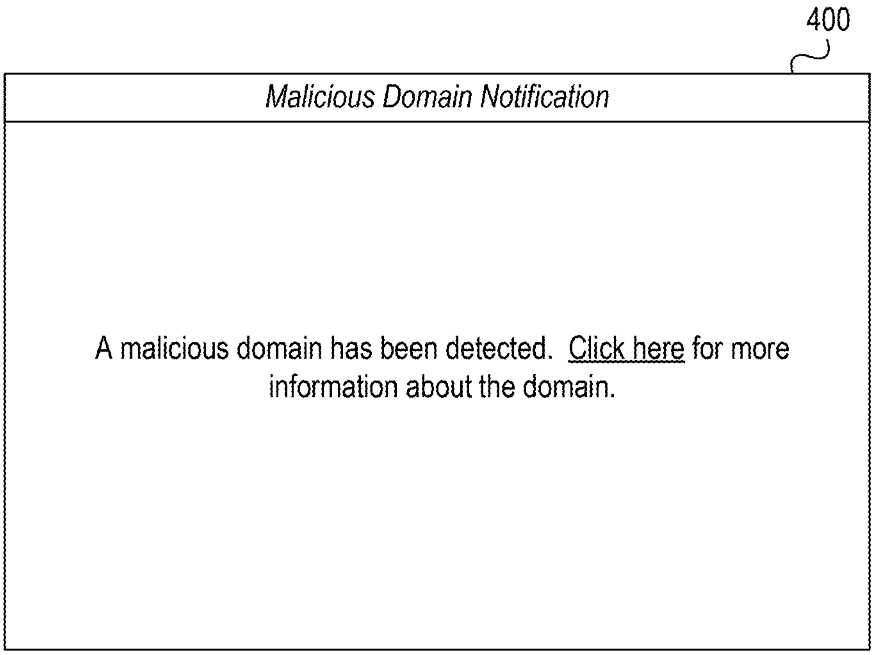
FIGS. 4 and 5 depict illustrative user interfaces for domain name lookalike identification in accordance with one or more example embodiments.

At step 212, based on or in response to the one or more commands directing the administrator user device 140 and/or the third party user device 160 to display the malicious domain notification, the administrator user device 140 and/or third party user device 160 may display the malicious domain notification. For example, the administrator user device 140 may display a graphical user interface similar to graphical user interface 400, which is shown in FIG. 4.

Figure 5:
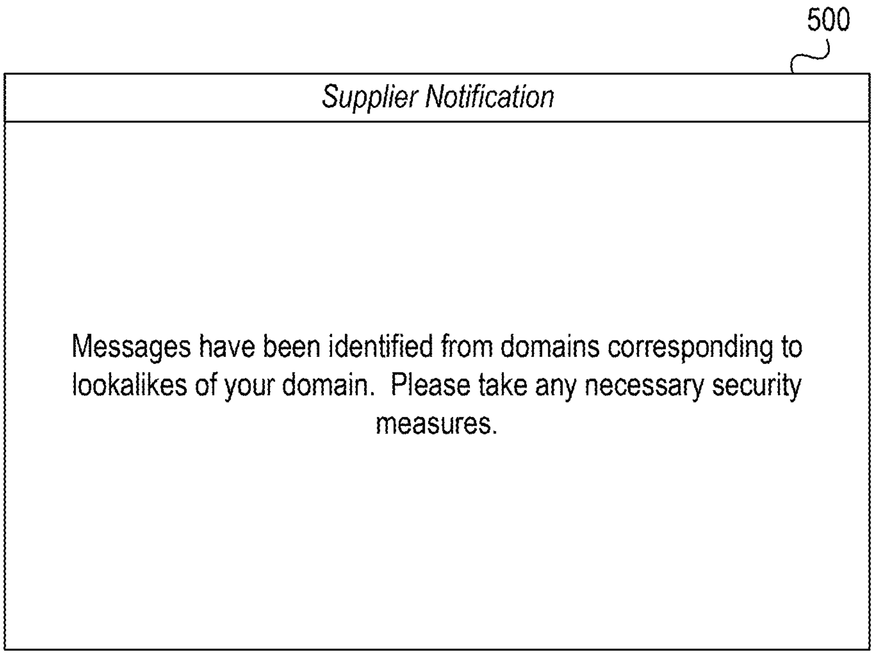

In some instances, the third party user device 160 may be associated with an enterprise of the input domain name corresponding to the identified lookalike domain name, and thus may display a notification warning a user of the identified malicious domain. For example, the third party user device 160 may display a notification that an identified lookalike domain corresponds to an input domain for a supplier or other third party corresponding to the third party user device 160 (e.g., warn the party being spoofed). In these instances, the third party user device 160 may display a graphical user interface similar to graphical user interface 500, which is shown in FIG. 5. In some instances, the administrator user device 140 and/or the third party user device 160 may display the maliciousness score, identified by the threat detection model at step 210.

In some instances, the third party user device 160 and/or the administrator user device 140 may display, along with the malicious domain, registration information for the malicious domain and/or the corresponding input domain. In some instances, the third party user device 160 and/or the administrator user device 140 may display one or more user controls or interface elements (e.g., checkboxes, a sliding interface element allowing adjustment of the list, and/or other elements) that may be used to filter a list of malicious domains including the malicious domain.

In some instances, the third party user device 160 and/or the administrator user device 140 may display a service that may allow users to input a domain, and may output the corresponding lookalike domains in real time.

Figure 2D:
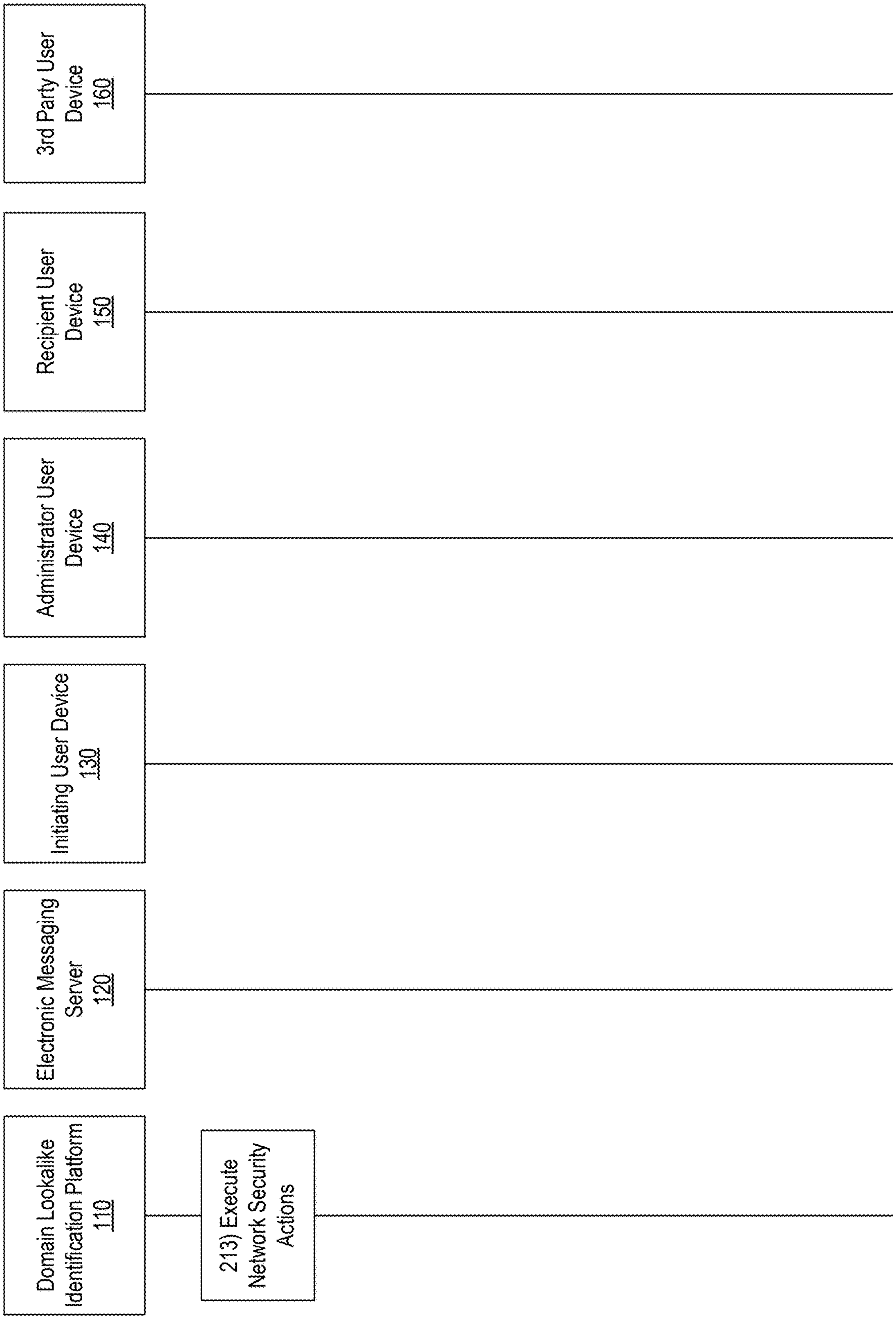

Referring to FIG. 2D, at step 213, the domain lookalike identification platform 110 may execute one or more network security actions. For example, the domain lookalike identification platform 110 may direct (e.g., by sending one or more commands) a network gateway to block messages from the first domain, quarantine messages from the first domain, cause network traffic to the first domain to open in a secure sandbox, send warning messages, and/or execute other security actions, which may, e.g., cause the network gateway (or other computing device) to execute such security actions. In some instances, the domain lookalike identification platform 110 may be implemented into the network gateway itself, and thus such security actions may be performed by the domain lookalike identification platform 110.

Although the above analysis is described primarily in terms of the first message, lookalike and/or malicious domains may be identified even if emails have not been received, or recently received, from the input domain that they are lookalikes of and/or before any message is received from a corresponding malicious or lookalike domain. For example, the domain lookalike identification platform 110 may monitor network traffic, historical messages, and/or other information to identify domain names for analysis.

Figure 3:
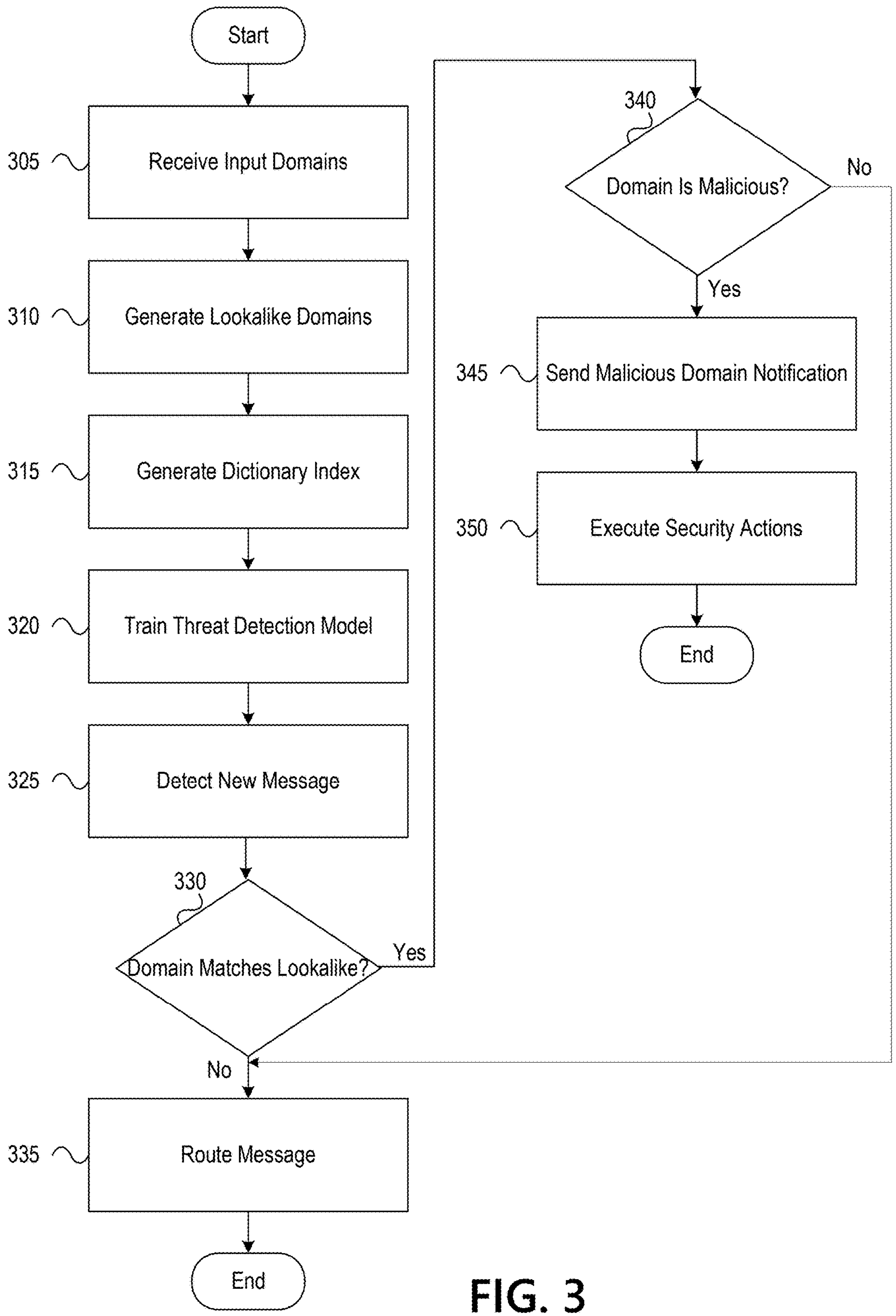
FIG. 3 depicts an illustrative method for domain name lookalike identification in accordance with one or more example embodiments.

FIG. 3 depicts an illustrative method for domain name lookalike identification in accordance with one or more example embodiments. Referring to FIG. 3, at step 305, a computing platform having at least one processor, a communication interface, and memory may receive one or more input domain names. At step 310, the computing platform may generate one or more lookalike domain names for each of the one or more input domain names. At step 315, the computing platform may generate a dictionary index based on the one or more lookalike domain names. At step 320, the computing platform may train a threat detection model to identify whether the one or more lookalike domain names correspond to malicious or non-malicious domains. At step 325, the computing platform may detect a new message from a first domain. At step 330, the computing platform may identify whether a first domain name of the first domain is a lookalike domain name. If the first domain name is not a lookalike domain name, the computing platform may proceed to step 335. At step 335, the computing platform may route the new message to an intended recipient.

Returning to step 330, if the first domain name is a lookalike domain name, the computing platform may proceed to step 340. At step 340, the computing platform may identify whether the first domain name corresponds to a malicious domain. If the first domain name does not correspond to a malicious domain, the computing platform may return to step 335. Otherwise, if the first domain name does correspond to a malicious domain, the computing platform may proceed to step 345.

At step 345, the computing platform may send a notification of the malicious domain. At step 350, the computing platform may execute one or more security actions for the malicious domain.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

generate a plurality of lookalike domain names for an input domain name;

generate a dictionary index;

identify a first domain name;

determine that the first domain name corresponds to a lookalike domain name in the dictionary index;

identify, after identifying that the first domain name comprises the lookalike domain name and based on a maliciousness score indicating a threat level of the first domain name, whether the lookalike domain name corresponds to a threat, wherein the maliciousness score is generated based on metadata corresponding to the first domain name; and send an indication that the first domain name corresponds to the lookalike domain name in the dictionary index, wherein the indication is sent to a user device of an administrator of the input domain name and a third party user device associated with an enterprise of the input domain name.

2. The computing platform of claim 1, wherein the indication includes that the lookalike domain name corresponds to a domain of a supplier or other third party associated with the third party user device, and warns the supplier or other third party of a spoofing attack.

3. The computing platform of claim 1, wherein the indication includes the maliciousness score.

4. The computing platform of claim 1, wherein the indication includes registration information for the first domain name.

5. The computing platform of claim 1, wherein the indication includes one or more elements configured to filter a list of malicious domains including the first domain name, wherein the one or more elements include one or more of: checkboxes or a sliding interface element allowing adjustment of the list.

6. The computing platform of claim 1, wherein the indication includes a service configured to output the plurality of lookalike domain names upon input of the input domain name.

7. The computing platform of claim 1, wherein generating the plurality of lookalike domain names comprises performing one or more of: character insertion, character omission, character substitution, top level domain (TLD) variation, bridging a dot, hyphenation, appending a prefix, appending a suffix, adding a supplier name as the TLD, adding the supplier name as a subdomain, adding a trusted entity name as the TLD, adding a trusted entity name as a subdomain, generating variations of the input domain name, or generating combinations of input domain names including the input domain name.

8. The computing platform of claim 1, wherein generating the plurality of lookalike domain names comprises removing, from the input domain name, one or more characters prior to generating the plurality of lookalike domain names, wherein the removal of the one or more characters is performed using a symmetrical delete method or a wildcard method.

9. The computing platform of claim 1, wherein the memory stores additional computer-readable instructions that, when executed by the at least one processor, further cause the computing platform to:

based on identifying that the lookalike domain name corresponds to the threat, perform one or more of:

sending one or more notifications indicating the threat, blocking messages corresponding to the lookalike domain name, quarantining messages corresponding to the lookalike domain name, and rewriting URLs corresponding to the lookalike domain name; and based on identifying that the lookalike domain name does not correspond to the threat, routing messages corresponding to the lookalike domain name for delivery.

10. The computing platform of claim 9, wherein identifying whether the lookalike domain name corresponds to the threat further comprises:

comparing the maliciousness score to a maliciousness threshold;

based on identifying that the maliciousness score meets or exceeds the maliciousness threshold, identifying that the first domain name corresponds to the threat; and based on identifying that the maliciousness score does not meet or exceed the maliciousness threshold, identifying that the first domain name does not correspond to the threat.

11. The computing platform of claim 10, wherein generating the maliciousness score is based on one or more of: how many letters were changed, whether an extension is the same or different, whether homoglyphs were used, whether the first domain name is contained within the lookalike domain name, whether the first domain name contains the lookalike domain name, an edit distance, differing extensions, an age of the first domain name, whether or not the first domain name is on a threat list, comparison of a registration email address for the lookalike domain name and the first domain name, a frequency of use of the lookalike domain name, whether threats are being actively sent from the lookalike domain name, reputation data, whois data, whether a registrar country is on a list of suspect registrar countries, whether the registrar country matches a registrar country for the first domain name, or whether a corresponding webpage exists.

12. The computing platform of claim 10, wherein generating the maliciousness score comprises generating a weighted result based on the metadata.

13. A method, comprising:

at a computing platform comprising at least one processor, a communication interface, and memory:
- generating a plurality of lookalike domain names for an input domain name;
- generating a dictionary index;
- identifying a first domain name;
- determining that the first domain name corresponds to a lookalike domain name in the dictionary index;
- identifying, after identifying that the first domain name comprises the lookalike domain name and based on a maliciousness score indicating a threat level of the first domain name, whether the lookalike domain name corresponds to a threat, wherein the maliciousness score is generated based on metadata corresponding to the first domain name; and
- sending an indication that the first domain name corresponds to the lookalike domain name in the dictionary index, wherein the indication is sent to a user device of an administrator of the input domain name and a third party user device associated with an enterprise of the input domain name.

14. The method of claim 13, wherein the indication includes that the lookalike domain name corresponds to a domain of a supplier or other third party associated with the third party user device, and warns the supplier or other third party of a spoofing attack.

15. The method of claim 13, wherein the indication includes the maliciousness score.

16. The method of claim 13, wherein the indication includes registration information for the first domain name.

17. The method of claim 13, wherein the indication includes one or more elements configured to filter a list of malicious domains including the first domain name, wherein the one or more elements include one or more of: checkboxes or a sliding interface element allowing adjustment of the list.

18. The method of claim 13, wherein the indication includes a service configured to output the plurality of lookalike domain names upon input of the input domain name.

19. The method of claim 13, wherein generating the plurality of lookalike domain names comprises performing one or more of: character insertion, character omission, character substitution, top level domain (TLD) variation, bridging a dot, hyphenation, appending a prefix, appending a suffix, adding a supplier name as the TLD, adding the supplier name as a subdomain, adding a trusted entity name as the TLD, adding a trusted entity name as a subdomain, generating variations of the input domain name, or generating combinations of input domain names including the input domain name.

20. One or more non-transitory computer-readable media storing instructions that, when executed by a computing platform comprising at least one processor, a communication interface, and memory, cause the computing platform to:
- generate a plurality of lookalike domain names for an input domain name;
- generate a dictionary index;
- identify a first domain name;
- determine that the first domain name corresponds to a lookalike domain name in the dictionary index;
- identify, after identifying that the first domain name comprises the lookalike domain name and based on a maliciousness score indicating a threat level of the first domain name, whether the lookalike domain name corresponds to a threat, wherein the maliciousness score is generated based on metadata corresponding to the first domain name; and
- send an indication that the first domain name corresponds to the lookalike domain name in the dictionary index, wherein the indication is sent to a user device of an administrator of the input domain name and a third party user device associated with an enterprise of the input domain name.

* * * * *